US008516671B2

(12) United States Patent
Scheidenhelm

(10) Patent No.: US 8,516,671 B2
(45) Date of Patent: Aug. 27, 2013

(54) HYDRAULIC LIP SEAL INSTALLATION DRIVER TOOL

(75) Inventor: Kurt J. Scheidenhelm, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 1040 days.

(21) Appl. No.: 12/544,249

(22) Filed: Aug. 20, 2009

(65) Prior Publication Data

US 2011/0041305 A1 Feb. 24, 2011

(51) Int. Cl.
*B23P 11/00* (2006.01)
*B23Q 7/10* (2006.01)

(52) U.S. Cl.
USPC ............. 29/252; 29/243.525; 29/818; 60/534

(58) Field of Classification Search
USPC ................. 29/252, 243.525, 724, 818, 426.4, 29/261, 215; 60/534, 572
See application file for complete search history.

(56) References Cited

U.S. PATENT DOCUMENTS 2,850,535 A 11/1958 Lane
3,749,365 A * 7/1973 Van Gompel ................. 254/104
3,828,415 A * 8/1974 Kammeraad et al. ...... 29/888.41
3,828,756 A * 8/1974 Kammeraad et al. ...... 123/188.9
3,934,325 A * 1/1976 Jaffe ........................ 29/243.529
4,488,713 A * 12/1984 Kosmal et al. .................. 269/25
4,515,376 A 5/1985 Okamuro
4,551,898 A 11/1985 Provost
4,580,435 A * 4/1986 Port et al. ................. 29/243.525
4,583,388 A * 4/1986 Hogenhout ..................... 72/393
4,597,263 A * 7/1986 Corbett ........................... 60/534
4,752,996 A * 6/1988 Berecz et al. ................... 29/240
4,845,822 A 7/1989 Hutson
4,845,826 A * 7/1989 Daniels, Jr. ..................... 29/252
5,375,308 A * 12/1994 Harris ............................. 29/215
5,485,727 A * 1/1996 Godfrey .......................... 60/572
5,709,018 A 1/1998 Dugan
5,870,815 A * 2/1999 Karner et al. ................ 29/407.1
5,896,639 A * 4/1999 Chen ............................... 29/261
6,000,680 A * 12/1999 Kimura et al. .............. 254/93 R
6,108,892 A * 8/2000 Shinozaki ....................... 29/450
6,543,117 B1 * 4/2003 Claycomb et al. ........... 29/426.4
6,581,261 B1 * 6/2003 Chen ............................... 29/252
6,648,339 B2 * 11/2003 Russell ......................... 277/617
6,721,381 B2 * 4/2004 Martin et al. ................. 376/204
6,775,892 B2 8/2004 Cotter (Continued)

*Primary Examiner* — Lee D Wilson
*Assistant Examiner* — Alvin Grant
(74) *Attorney, Agent, or Firm* — Janda Carter

(57) ABSTRACT

A hydraulic seal installation tool having an elongate body portion fixedly attached to a holding portion. The elongate body portion has a hydraulic cylinder actuation means, and a driver mechanism head portion is coupled to the elongate body portion; and an installation method for mounting a seal, involving the steps of presenting a hydraulic seal installation tool to a seal bore, where the tool has a lip seal inserted upon a driver ring of the tool. Inserting the tool into the seal bore, depressing an activation button on a handle of the tool thereby actuating a hydraulic cylinder actuation means. Expanding a plurality of engagement projection fingers, locking the plurality of engagement projection fingers in place while providing an axial alignment reaction force; overcoming a first actuation force on a spring to actuate the driver ring, by a second actuation force, pulling the seal into seal bore, dwelling for approximately five seconds to fully seat the seal, breaking the circuit to the hydraulic actuation means by releasing the activation button. Withdrawing the driver ring from the seal, retracting the engagement projection fingers and withdrawing the tool from the seal bore.

18 Claims, 4 Drawing Sheets

(56) References Cited

U.S. PATENT DOCUMENTS

| | | | | |
|---|---|---|---|---|
| 6,895,646 | B1 * | 5/2005 | Houg | 29/252 |
| 6,910,251 | B2 | 6/2005 | Gorg et al. | |
| 6,912,764 | B2 * | 7/2005 | Amburgey | 29/252 |
| 7,020,943 | B2 * | 4/2006 | Cronk | 29/252 |
| 7,043,826 | B2 * | 5/2006 | Naito | 29/798 |
| 7,076,851 | B2 * | 7/2006 | Rousset | 29/252 |
| 7,389,579 | B2 * | 6/2008 | Rode | 29/724 |
| 7,677,853 | B2 * | 3/2010 | Donovan | 411/361 |
| 7,788,778 | B2 * | 9/2010 | Relan | 29/235 |
| 7,984,538 | B2 * | 7/2011 | McKay | 29/237 |
| 7,996,972 | B2 * | 8/2011 | Hu | 29/252 |
| 8,015,699 | B2 * | 9/2011 | Fulbright | 29/818 |
| 8,256,104 | B2 * | 9/2012 | Fulbright | 29/818 |
| 8,316,530 | B2 * | 11/2012 | Rode | 29/724 |
| 2008/0023099 | A1 | 1/2008 | Schubert et al. | |

* cited by examiner

HYDRAULIC LIP SEAL INSTALLATION DRIVER TOOL

TECHNICAL FIELD

The present disclosure relates generally to tooling apparatus operable to facilitate the installation of seals or the like, and more particularly, to self-piloting, hydraulically assisted tools used for driving and installing seals into seal bores, or the like.

BACKGROUND

Seals are used in numerous industries including agricultural, construction, forestry, transportation, and utility. Lip seals are commonly used on equipment such as transmission housings, around rotating shafts and where the prevention of leaks is important. Installation of these annular resilient seals can be difficult in applications where the size and or geometric features of the components to which they are being installed are large or bulky. The use of conventional tooling and or presses in this environment is impractical.

Ergonomic nightmares occur where operators are required to install seals toward the end of the assembly process. At this stage, the equipment and systems are often extremely large and bulky, where, for example, the transmissions already have their housings attached. The size of the housings for construction and agricultural equipment transmissions is typically significantly great, again leading to difficult later assembly installation. For example, seals that must be placed deep into housing bores lead to blind sight installation and require severe bending and twisting of the body and arms, which is a great concern when using known conventional tooling.

Enabling ergonomically safe and quality installations also has significant advantages from a serviceability standpoint, when the equipment is out in the field or with a dealer for repair. Additionally, ineffective processes can lead to wasted money as well as higher manufacturing costs and serious timing problems.

Seal installation is, of course quite well known to the prior art. While the use of various insertion apparatuses is old in the art, the use of conventional hammer tools has presented a number of problems. Most lip seals are hammered in, as discussed in U.S. Pat. No. 5,052,695 ('695) to Curtis. The '695 patent describes a necessary force to position a seal within a gap which is applied by a direct thrust applied to a tool upon its head region for a hammer impact. This conventional type tooling may lead to shock being induced into the seal and or surrounding area, thereby decreasing the quality.

Other conventional processes involve attaching a base unit, secured by nuts on threaded rods, to a casting, with the base unit locating in a bore. A seal is placed on a manual driver which pilots in the base unit, and then is driven into the seal bore by striking the opposite end of a driver with a hammer. Whenever a driving force delivered by impact is delivered, the potential for damaging the seal or the inner surface of the bore is always present.

An apparatus and method are needed to provide a way to install lip seals in specific applications where conventional tooling is impractical. A method is needed that provides a means of complying with lip seal assembly best practices to improve the quality of assembled products. A tool is needed that reduces the quantity of loose tooling; reduces handling of products during assembly, and reduces the time required to complete lip seal assembly by reducing the individual installation steps. The tool should also address the known problems with seals not installing straight (thereby causing leaks) and correct the numerous situations where non-piloted drivers are used (and where piloting is not possible).

The present innovation differs from those predecessor installation tools in that this design teaches simultaneous piloting and driving during installation of the lip seal. This eliminates the need for a separate drive force from the use of a hammer or other instrument. These and other difficulties experienced with the prior art tools have been obviated in a novel manner by the present disclosure.

SUMMARY

The presently disclosed embodiment may be characterized as a hydraulic seal installation tool having an elongate body portion fixedly attached to a holding portion. The elongate body portion has a hydraulic cylinder actuation means, and a driver mechanism head portion is coupled to the elongate body portion.

The presently disclosed embodiment further involves an installation method for mounting a seal, involving the steps of presenting a hydraulic seal installation tool to a seal bore, where the tool has a lip seal inserted upon a driver ring of the tool. Inserting the tool into the seal bore, depressing an activation button on a handle of the tool thereby actuating a hydraulic cylinder actuation means. Expanding a plurality of engagement projection fingers, locking the plurality of engagement projection fingers in place while providing an axial alignment reaction force; overcoming a first actuation force on a spring to actuate the driver ring, by a second actuation force, pulling the seal into seal bore, dwelling for approximately five seconds to fully seat the seal, breaking the circuit to the hydraulic actuation means by releasing the activation button. Withdrawing the driver ring from the seal, retracting the engagement projection fingers and withdrawing the tool from the seal bore.

Other advantages and novel features of the present disclosure will become apparent from the following detailed description of the disclosure when considered in conjunction with the accompanying drawings.

DETAILED DESCRIPTION

Figure 1:
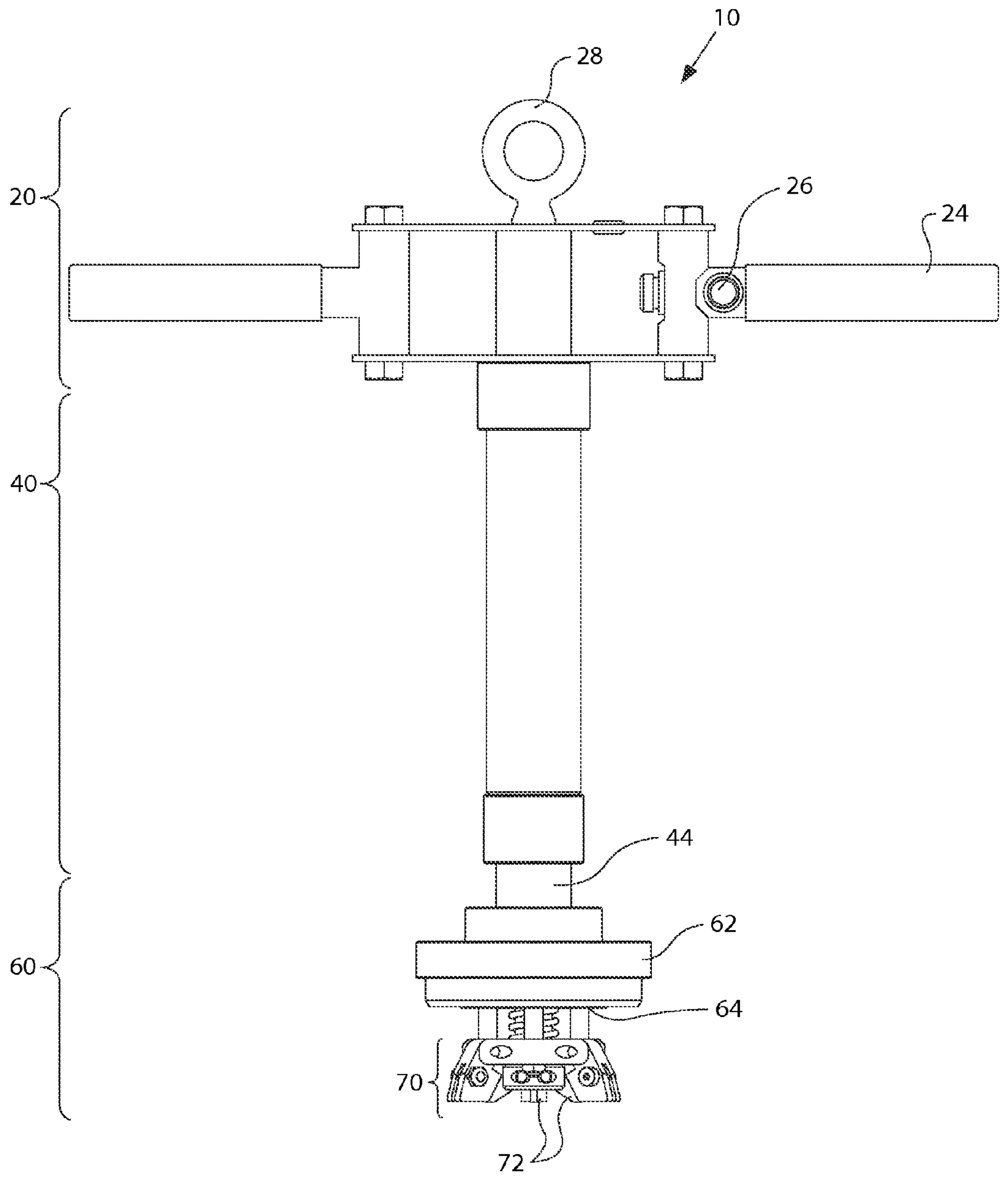
FIG. 1 depicts a side view of a hydraulic lip seal driver tool according to an exemplary embodiment of the present disclosure.

The present innovation differs from predecessor installation tools in that this design teaches simultaneous piloting and driving during installation of an annular resilient member, or lip seal. This eliminates the need for a separate drive force from the use of a hammer or other instrument. Referring to FIG. 1 in detail, an embodiment of the hydraulic lip seal driver tool 10 is generally illustrated. The tool 10 has a holding portion 20, an elongate body portion 40 and a driver mechanism head portion 60 which are all coupled.

A suitably shaped handle 24 is located within the holding portion 20 to facilitate easy hand actuation. The handle 24 may be made of metal, resin, plastic or the like, and may be covered or coated with a comfort-grip material (not shown).

The overall tool 10 may be suspended and attached to a balancer mechanism (not shown) via a balancer eye 28. A conventional tool balancer may be operably connected for ease of use, in a manufacturing facility, for example. A cable would support an upper end of the tool 10 at the holding portion 20. The cable would extend and retract as necessary from the tool balancer. A hose (possibly coiled) may mover the tool when an operator wishes to operate the tool 10, and the hose may supply the hydraulic fluid to the cylinder of the tool 10.

The holding portion 20 and the elongate body portion 40 are fixedly attached. The tool 10 further includes a retractable finger mechanism 70 having engagement projection fingers 72. The elongate body portion 40 is operably connected to the driver mechanism head portion 60 via hydraulic cylinder/center rod 44. The driver mechanism head portion 60 and the elongate body portion 40 encompass the bulk of the hydraulic actuation mechanisms and an empowerment means may be arranged on the end of the elongate body portion 40, as would be understood by one skilled in the art.

Pull type hydraulic cylinders are well known in the art and are preferably used in the present innovation. This force-applying tool 10 has mechanical advantage available through the assertion of hydraulic pressures over differential areas in conventional means. The pull-type hydraulic cylinder is preferably of conventional construction and operation, and therefore will not be further described. Although the pull type hydraulic cylinder pull type methodology itself is not described in detail, it would be apparent to those skilled in the art of the general hydraulic actuation that will form part of this drive mechanism.

Figure 2:
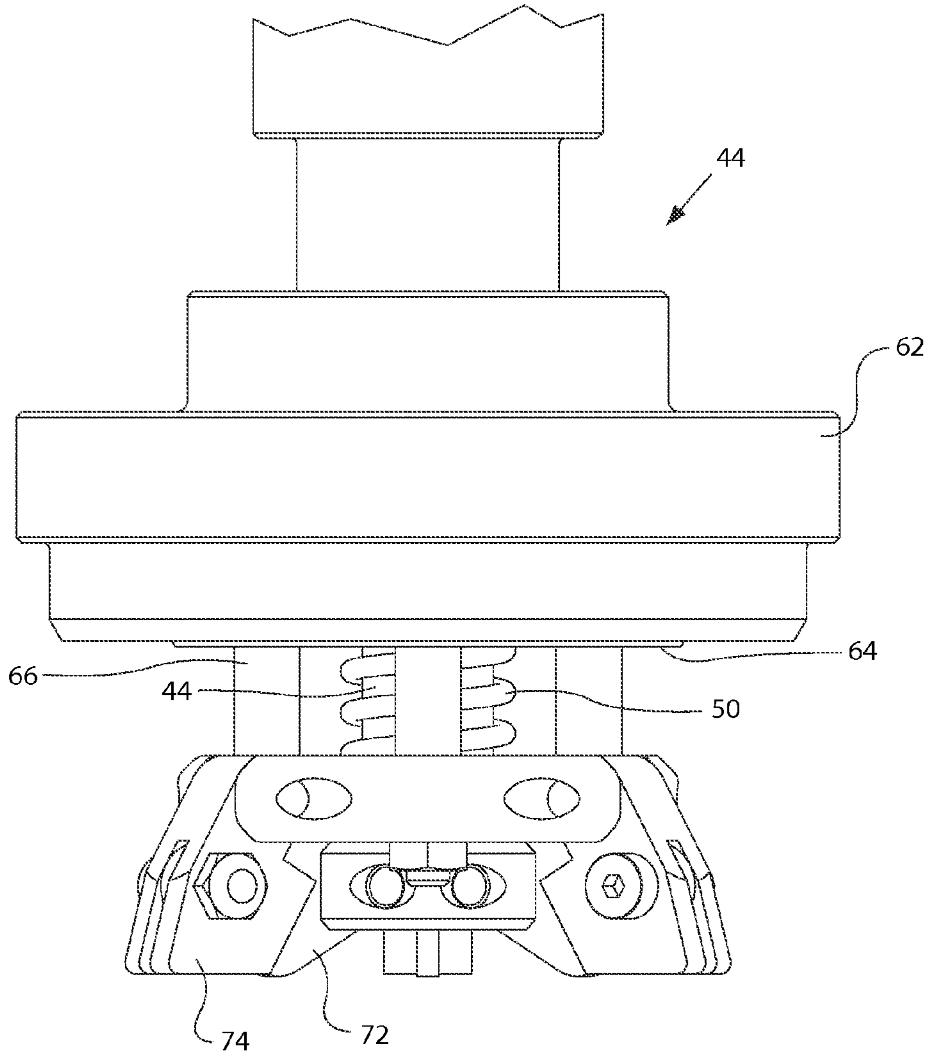
FIG. 2 is an enlarged view, partly broken away, of a portion of an embodiment of the hydraulic lip seal driver tool of the present disclosure.

The driver mechanism head portion 60 may include a top piloting ring 62 coaxially positioned over a driver ring 64, as shown in FIG. 2. The top piloting ring 62 and the driver ring 64 may be concentric with one another, the top piloting ring 62 generally aligned to encompass the driver ring 64, while driver ring 64 is in retracted position. A seal (not shown in this view) is initially positioned over the driver ring 64 which would be configured so as to fit the lip seal or other annular resilient seal configuration with which it is to be installed. The top piloting ring 62 and the driver ring 64 are aligned to protect the seal with the top piloting ring 62 having a larger diameter than, and engulfing the driver ring 64. The seal remains in carrier contact with the driver ring 64 as the tool 10 is placed in position for installation procedures.

The term "seal" is used in this specification to include for example both annular-lipped seals for use in providing a dynamic seal between an internal lip on the seal and a housing surrounded by the seal. As well as possibly core plus seals, which have a sealing periphery, forming a static seal with an internal periphery of a bore. The tool 10 may also be used in the application of a seal to an annular gap between a shaft and a fixed body such as an engine block, or in the application of a housing, which may include a pre-mounted seal to a shaft projecting from a fixed body, as would be understood by one skilled in the art.

The driver mechanism head portion 60 may be operably attached to the retractable finger mechanism 70, via a plurality of fixed rods 66. A spring 50 reacts against the driver ring 64 of the driver mechanism head portion 60, and allows the engagement projection fingers 72 to expand into position before hydraulic pressure overcomes the spring 50 and actuates the mechanism 70, which then assembles the seal and keeps force temporarily on the driver ring 64 until the fingers 72 are engaged. As would be understood, two or more hydraulic cylinders could be used to individually actuate the engagement projection fingers 72 and driver mechanism head portion 60. The spring 50 may be concentrically located around the center cylinder rod 44. Driver mechanism head portion 60, elongate body portion 40, and spring 50 are preferably made of metal and, but may be made of any suitable material as would be understood by one skilled in the art.

This innovation contemplates a mechanism that includes a hydraulic cylinder that actuates a plurality of engagement projection fingers 72 that pilot a lip seal 80 in a housing 90, and provide reactive force for insertion of the seal 80. The fingers 72 are connected with a hinge-connecting link 74. The link 74 further operates to protect the seal 80 and prevents the seal 80 from grabbing on to the fingers 72 during removal. The engagement projection fingers 72 are retractable and rotatably attached. The fingers 72 of the present disclosure are disclosed in detail regarding one embodiment, however, it should be appreciated by those of ordinary skill that other embodiments would fall within the scope of the innovation.

Figure 3:
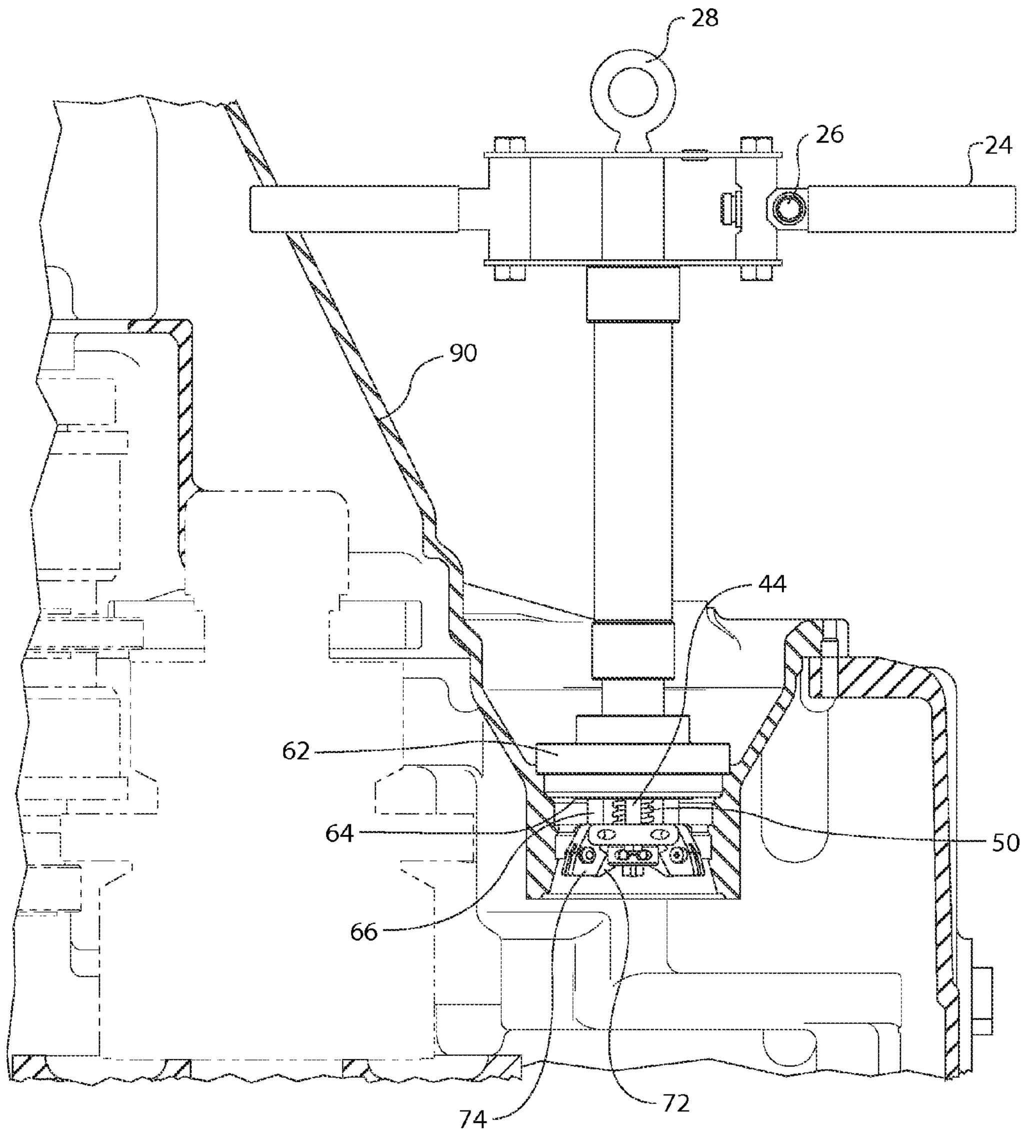
FIG. 3 is a side view of the hydraulic lip seal driver tool in accordance with the present disclosure, showing the tool in use in driving and installing a seal; and, FIG. 4 is a cross section through a broken away portion of an embodiment of the hydraulic lip seal driver tool of the present disclosure.
Figure 4:
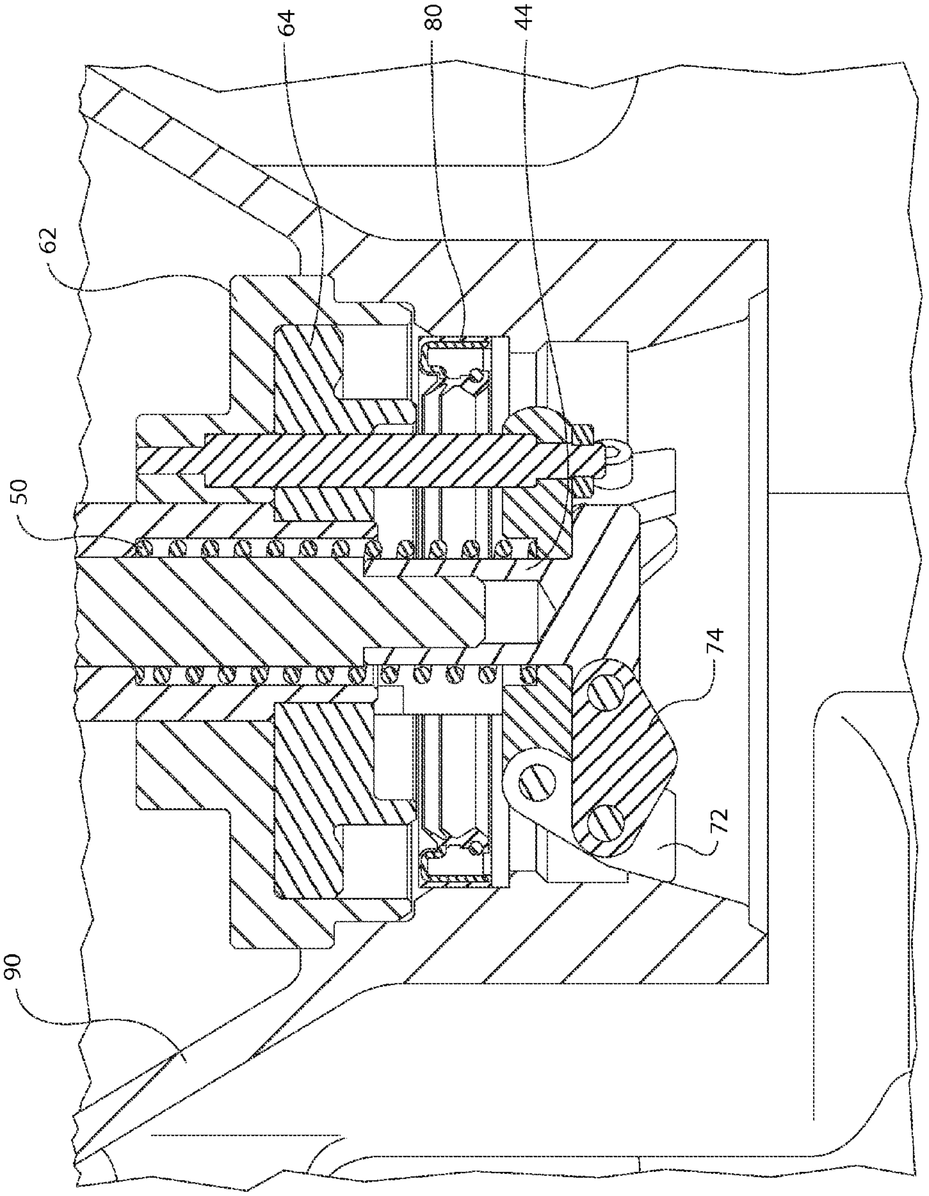

Turning now to FIG. 3, to apply the seal to the bore, the tool 10 is offered up to the bore and is pressed into the bore. It will be noted that the leading end of the driver mechanism head portion 60 may be chamfered to facility entry and provide a guide for entry of the tool 10. As the tool 10 is inserted, the outer region of the driver mechanism head portion 60 of the tool may come into contact with the inner surface of the bore in the housing 90 and may fit tightly against it.

In one exemplary embodiment, the engagement projection fingers 72 of the hydraulic lip seal driver tool 10 are inserted along a tapered bearing cup, as shown in FIG. 3. During the installation operation, the tool 10 is first inserted in the bore, and then the operator squeezes an actuation button 26 on the handle 24 that activates the hydraulic source.

Optionally, plurality of fixed rods 66 may connect the driver mechanism head portion 60 and the retractable finger mechanism 70. The driver ring 64, upon activation of the actuation button 26 will traverse downward along the optional plurality of rods 66 as the installation of the lip seal 80 begins.

The first stage of actuation expands a plurality of engagement projection fingers 72 which engage a surface below the seal bore, for example a tapered bearing cup, and locks them 72 in place, providing axial alignment and reaction force. The second stage of actuation overcomes the spring 50 and actuates the driver ring 64, pulling seal 80 into seal bore. To overcome, as would be understood by one skilled in the art, would be the second actuation force is larger than the first force. Next is implementation of a dwell cycle, which may optionally last for approximately 4-6 seconds, to allow the seal 80 to fully seat in the bore. As the cylinder rod 44 continues to retract, the driver ring 64 is forced downward, which presses and seats the seal 80 into the bore. The operator then releases the actuation button 26, or optionally a timed relay (not shown) breaks the circuit to the hydraulic source. The third stage of actuation withdraws the driver ring 64 from the seal 80. At the fourth stage of actuation, as the cylinder rod 44 fully extends, the engagement projection fingers 72 return to their original retracted position. Then the tool 10 is withdrawn from the housing 90. Finally, the operator withdraws the tool 10. When the hydraulic pressure is released, the cylinder rod 44 extends, which disengages the driver ring 64 from the seal 80.

Where the tool 10 is used in the installation of a seal into an annular gap, it is preferably constructed so that the friction between the cylindrical region and the inner periphery of the seal is less than the friction between the outer periphery of the seal and the outer wall of the annular gap, so that the seal stays in place whilst the tool is withdrawn.

In accordance with the present disclosure, hydraulic actuation is manually activates by operator depressing button 26. However, it is to be understood that the term manually as used in connection with the hydraulics may be connected to a battery-type operation, or involve a toggle or trigger switch, or the like. It will also be understood that this tool may involve an automatic controller, or other understood equipment for automated operation.

The overall dimensions of the tool may vary according to need; however, the overall length width of the tool 10 and driver mechanism head portion 60 is appropriately sized to drive and install a lip seal or other annular resilient member, so that manual, or conventional hammering methods are not necessary. The overall length of the tool handle 24 is appropriate to hold comfortably in the hand. The dimensions and possible orientation angles on the elongate body portion 40 may also vary according to need to reach formerly inaccessible areas.

INDUSTRIAL APPLICABILITY

When the operator wishes to insert the tool into an opening or bore, and thereby insert and engage the seal with the housing, the following procedure is carried out: the user presents the tool into the opening such that in addition to the operation described above with reference to the tapered edge and pivotal release mechanism, the tool 10 is inserted into a seal bore. Operator depresses button 26 on handle 24 that actuates hydraulic source. First stage of actuation expands a plurality of locking engagement projection fingers 72 which engage tapered bearing cup below the seal bore surface and lock in place, providing axial alignment and reaction force. Second stage of actuation overcomes spring and actuates driver ring, pulling seal into seal bore and dwelling for approximately (5) seconds to fully seat seal. Operator releases button, or timed relay breaks circuit to hydraulic source. Third stage of actuation withdraws driver ring from seal. Fourth stage of actuation retracts locking fingers. Finally, the operator withdraws tool.

This tool 10 may be used where an operator is installing the last component for the large transmission housing. Hydraulic pressure does the action, while the hydraulic cylinder is preferably single actuating. The hydraulic cylinder of the present innovation may be the pull type cylinder operation, with a single cylinder active. The cylinder applies a single force and all other related action is by spring force.

Further, the present innovation teaches control of multiple actions with a single linear motion, the use of geometry to provide a rigid reaction force, and the use of a geometric form of link components to guard retracted locking fingers from contacting a seal.

It is also important to note that the construction and arrangement of the elements of the hydraulic lip seal driver tool as shown in the preferred and other exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, etc.) without materially departing from the novel teachings and advantages of the subject matter recited. For example, the length or width of the projections or fingers or head portions may be varied, and/or the nature or number of adjustment positions provided between the elements may be varied. Those skilled in the art will appreciate that whilst in the above disclosure a hydraulically powered tool has been described, there is no necessity for this to be the case. The advantages of the present innovation are shown, but tool may optionally may be operated utilizing corded or battery power. It should be noted that the elements of the hydraulic lip seal driver tool might be constructed from any of a wide variety of materials that provide sufficient strength or durability, and in any of a wide variety of colors, textures and combinations. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present disclosure.

I claim:

1. An hydraulic seal installation tool comprising:

an elongate body portion fixedly attached to a holding portion; said elongate body portion having a hydraulic cylinder actuation means;

a driver mechanism head portion coupled to said elongate body portion, the head portion including;

a top piloting ring for piloting said seal; said top piloting ring providing protection for said seal during tool insertion and positioning into a seal bore;

a driver ring, being coaxially positioned under said top piloting ring; and a retractable finger mechanism operably connected to said top piloting ring and said driver ring, said retractable finger mechanism having a plurality of engagement projection fingers.

2. The hydraulic seal installation tool of claim 1, wherein said holding portion further includes a handle and an actuation button, said actuation button operable to activate said hydraulic cylinder actuation means.

3. The hydraulic seal installation tool of claim 2, wherein said tool has a counter balance mechanism.

4. The hydraulic seal installation tool of claim 1, wherein said engagement projection fingers are connected with a hinge-connecting link; said link providing protection for said seal during tool removal after installation.

5. The hydraulic seal installation tool of claim 1, wherein said engagement projection fingers are retractable and rotatably attached.

6. The hydraulic seal installation tool of claim 1, wherein a leading end of said driver mechanism head portion may be chamfered to provide a guide for entry of said tool into a seal bore.

7. The hydraulic seal installation tool of claim 1, wherein said hydraulic cylinder actuation means includes a spring that reacts against said driver ring of said driver mechanism head portion causing said engagement projection fingers to rotatably expand, by a first actuation force.

8. The hydraulic seal installation tool of claim 1, wherein said plurality engagement projection fingers lock into place providing axial reaction alignment force.

9. The hydraulic seal installation tool of claim 1, wherein a second actuation force on said driver ring of said driver mechanism head portion overcomes said spring to pull said seal into said seal bore.

10. The hydraulic seal installation tool of claim 1, wherein said tool further includes a dwell cycle; said dwell cycle providing appropriate tool dwell time to allow said seal to fully seat in said seal bore.

11. The hydraulic seal installation tool of claim 10, wherein said dwell cycle is approximately four to six seconds.

12. The hydraulic seal installation tool of claim 10, wherein said dwell cycle is approximately five seconds.

13. The hydraulic seal installation tool of claim 1, wherein said tool is self-piloting.

14. The hydraulic seal installation tool of claim 1, wherein said tool is hand-held.

15. The hydraulic seal installation tool of claim 1, wherein said handle is made of a comfort grip material.

16. An hydraulic seal installation tool comprising: a holding portion having a handle, an actuation button on said handle operable to activate a hydraulic cylinder actuation means, an elongate body portion relatively perpendicular to said handle, the elongate body portion housing a hydraulic actuation means; a plurality of engagement projection fingers radially aligned along a driver mechanism head portion configured to engage a lip seal for insertion into a seal bore, said driver mechanism head portion including a top piloting ring, a driver ring, and a retractable finger mechanism.

17. An installation method for mounting a seal, comprising the steps of:

presenting said hydraulic seal installation tool of claim 1 to a seal bore; said tool having a lip seal inserted upon a driver ring of the tool;

inserting said tool into said seal bore;

depressing an activation button on a handle of said tool thereby actuating a hydraulic cylinder actuation means;

expanding a plurality of engagement projection fingers;

locking said plurality of engagement projection fingers in place while providing an axial alignment reaction force;

overcoming a first actuation force on a spring to actuate said driver ring, by a second actuation force;

pulling said seal into said seal bore;

dwelling for approximately five seconds to fully seat said seal;

breaking the circuit to said hydraulic actuation means by releasing said activation button;

withdrawing said driver ring from said seal;

retracting said engagement projection fingers; and withdrawing said tool from said seal bore.

18. The installation method for mounting a seal of claim 17, wherein the circuit to said hydraulic cylinder actuation means is broken by the step of: activating a timed relay.

* * * * *